Oct. 11, 1966  M. B. SAMPSON  3,278,194
UNIVERSAL JAW
Filed May 1, 1963  2 Sheets-Sheet 1

INVENTOR.
MERRITT B. SAMPSON
BY
ATTORNEY

Oct. 11, 1966  M. B. SAMPSON  3,278,194
UNIVERSAL JAW
Filed May 1, 1963   2 Sheets-Sheet 2

INVENTOR
MERRITT B. SAMPSON

United States Patent Office 3,278,194
Patented Oct. 11, 1966

3,278,194
UNIVERSAL JAW
Merritt B. Sampson, Shaker Heights, Ohio, assignor to The S-P Manufacturing Corporation, Solon, Ohio
Filed May 1, 1963, Ser. No. 277,341
13 Claims. (Cl. 279—120)

This invention pertains to chucks for machine tools and more particularly to a new and improved universal chuck jaw.

In operating metal working lathes for relatively high volume production runs, it is customary to custom machine a set of chuck jaws for a specific product. The customary technique is to position a set of blank jaws on the chuck and then bore or otherwise machine the blanks to obtain work gripping surfaces of a desired shape and size.

When the machine operator wishes a relatively small number of parts as for experimental work or relatively low volume production runs, it is desirable to use a universal jaw which does not require special machining. Prior to this invention available universal jaws have had inherent drawbacks which limit the use of such jaws and, in fact, prevent the use of such jaws under certain circumstances. One of the principal of these drawbacks has ben that with many machine tools such as modern automatic lathes, there is insufficient clearance to permit the use of previously available universal jaws.

Accordingly, one of the principal objects of this invention is to provide a novel and improved universal jaw which occupies a minimum of space and thereby provides adequate clearance for use on automatic lathes and other machine tools.

Another important object of the invention is to provide an improved universal jaw in which removable inserts have convexly curved, serrated, work gripping surfaces and in which the inserts are rotatable. Thus, this object is to permit all portions of the serrated circular surface to be used as work gripping surfaces thereby accommodating wear and providing long insert life.

Further important object of the invention is to provide a universal jaw which can be used for gripping either an internal or an external work piece surface.

Additional object of the invention is to provide a universal jaw in which mounting bolts project past the face of the jaw to provide work piece contacting wear surfaces thereby lengthening the life of the jaw.

Figure 1:
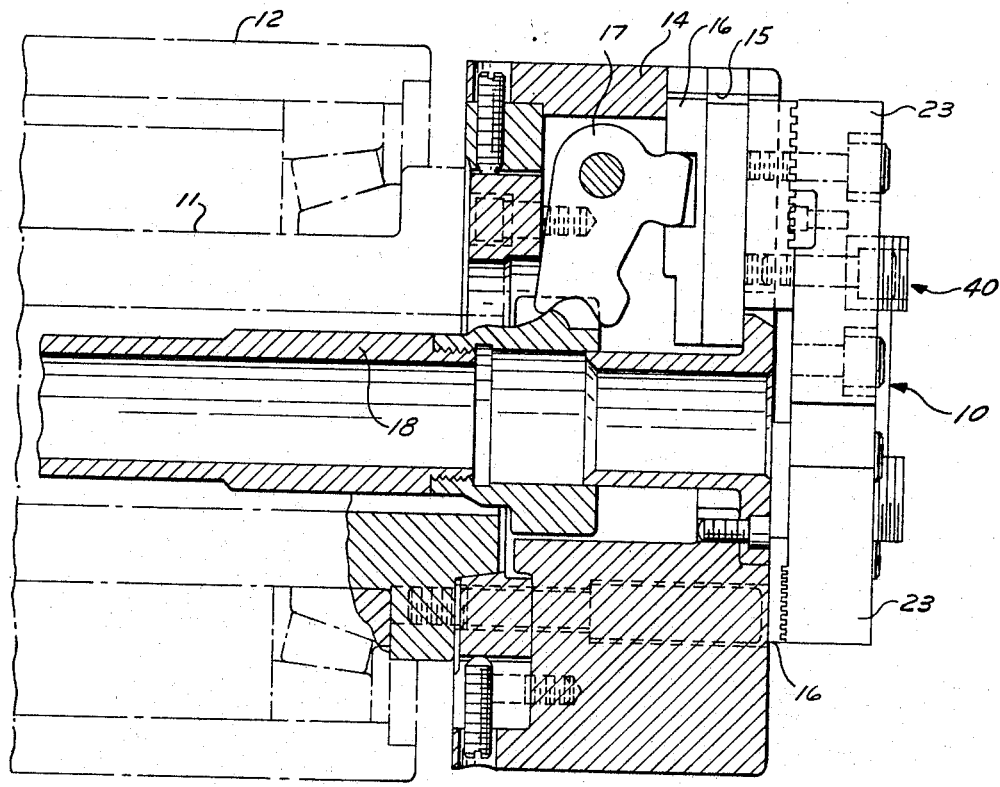
Figure 5:
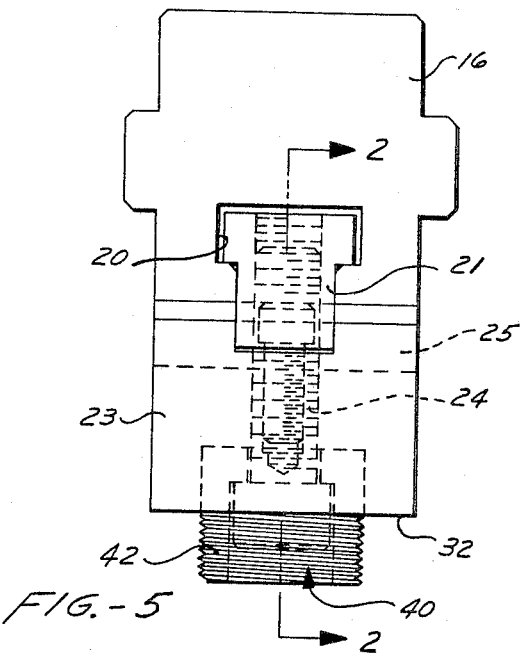
Figure 4:
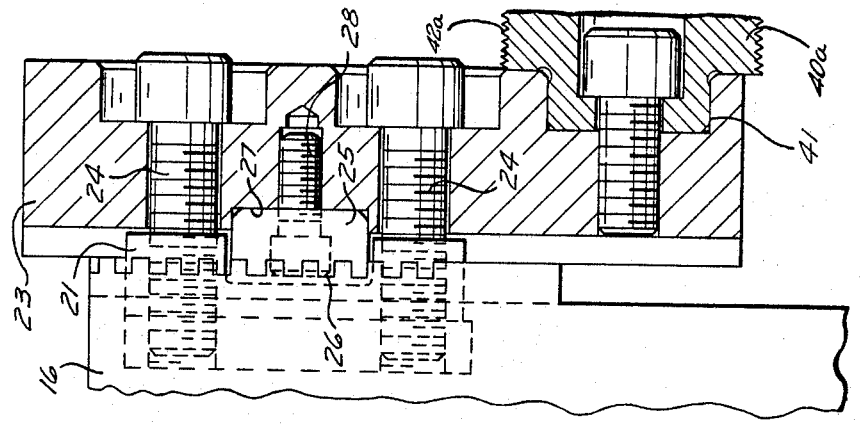
Figure 3:
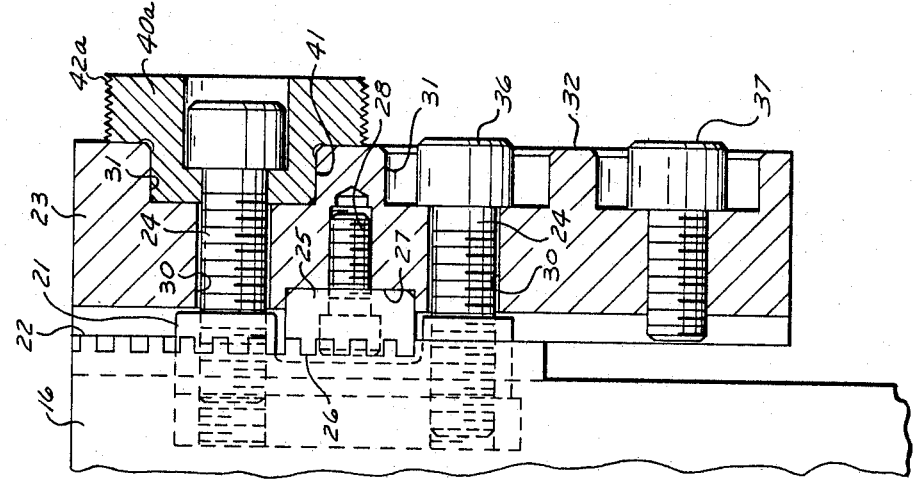
Figure 2:
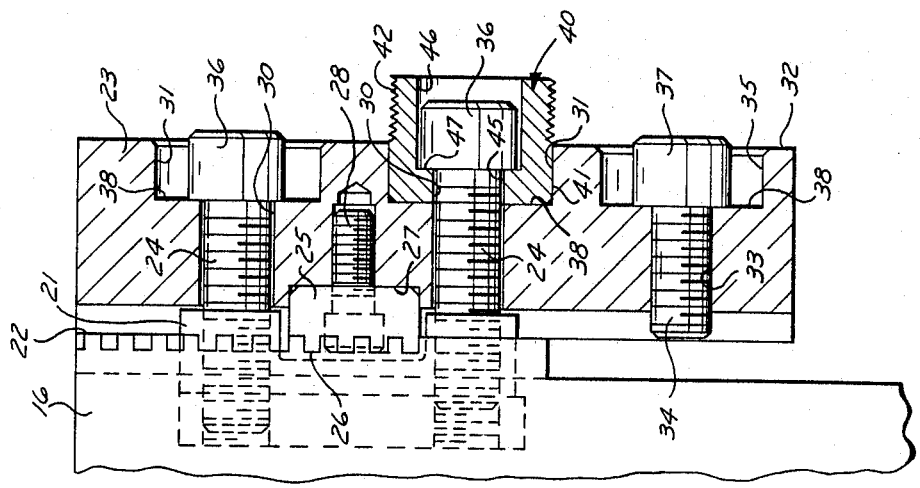

Other objects and a fuller understanding of the invention may be had by referring to the following description and claims taken in conjunction with the accompanying drawings in which:

FIGURE 1 is a sectional view of a three-jaw chuck showing two of the universal jaws;

FIGURES 2, 3, and 4 are sectional views, each on an enlarged scale with respect to FIGURE 1 and as seen from the plane indicated by the line 2—2 of FIGURE 5, and each showing one of the novel and improved universal jaws with an insert mounted in one of its several adjustment positions; and FIGURE 5 is a top plan view on the scale of FIGURES 2 and 3 of the jaw connected to its slide.

In FIGURE 1 a lever operated slide jaw chuck is shown generally at 10. The details of construction of the lever operated chuck 10 are more completely described in copending application for patent Serial No. 257,002 filed February 7, 1963, by Merritt B. Sampson under the title Adjustable Universal Chuck now Patent No. 3,178,192.

The chuck 10 is connected to a machine tool spindle 11 journaled in a head stock 12. The spindle 11 and head stock 12 are shown in phantom.

The chuck 10 has a body 14 equipped with a plurality of ways 15. The pictured chuck is a three-jaw chuck having three circumferentially spaced and radially disposed sets of ways, only one of which is shown in the drawing. Each of the ways 15 supports a radially movable slide 16 which is also of conventional construction. An operating lever 17 engages each of the slides 16. Actuation of a draw tube 18 in a manner described more completely in the above-referenced application moves the levers pivotally and causes the slides 16 to be shifted radially in the ways 15.

Each of the slides 16 has a radially extending T-shaped slot 20, FIGURE 5. Each slide 16 has a jaw nut 21 which is slidably disposed in its slot 20. The jaw nuts 21 each project outwardly past a serrated face 22 of the slide 16. Three jaw bodies 23 are provided. Each jaw body 23 is connected to one of the jaw nuts 21 by a pair of jaw mounting bolts 24.

A jaw key 25 is positioned between each jaw body 23 and its slide 16. The key 25 has an inwardly directed serrated face 26 which is in jaw locating engagement with the serrated face 22 of the slide 16. The key 25 straddles the slot 20. The key 25 is positioned within a transverse recess 27 in the back of the jaw body 23 and secured to the jaw body by a bolt 28.

Each of the jaw mounting bolts 24 projects through a through bore 30 in the jaw body 23. Each of the bores 30 is counterbored at 31 adjacent face 32 of the jaw body 23. In the preferred and disclosed arrangement, each jaw body 23 is equipped with a third through bore 33 which is threaded to receive an insert mounting bolt 34. The third through bore 33 is counterbored at 35 adjacent the face 32 of the jaw body 23. The axes of the counterbores 31, 35 are parallel to one another and to the axes of the chuck. The axes of the counterbores 31, 35 are also aligned along a radius of the chuck and uniformly spaced, radially speaking. The counterbores 31, 35 are carefully formed and identical to one another to provide locating surfaces for inserts as will be described presently.

The jaw mounting bolts 24 and the insert mounting bolt 34 are preferably socket head cap screws, equipped respectively with cylindrical heads, 36, 37, of an axial length greater than the depth of the counterbores 31, 35. The heads 36, 37 have this greater axial length so that when tightened against bottoms 38, of the counterbores 31, 35, the heads 36, 37 project outwardly past the face 32 of the jaw body 23. The heads 36, 37 of the bolts are preferably hardened to provide long wear and since they project past the face 32 of the jaw body 23, these heads provide work piece locating surfaces against which a work piece may be abutted. Because of their projecting past the face 32 of the jaw body 23, they maintain work pieces out of contact with the jaw body providing easily replaceable stop and wear surfaces and prolonging the lives of the jaw bodies.

One of the outstanding advantages of this invention resides in removable work piece gripping inserts 40, 40a. Each of the inserts 40, 40a has a cylindrically contoured locating portion 41 which telescopes snugly into a selected one of the counterbores 31, 35. As will be seen by a comparative examination of FIGURES 2 through 4, one insert in connected to each jaw body and positioned in anyone of the three counterbores. Each insert includes a work gripping portion including a circular serrated work gripping surface 42, 42a projecting outwardly from the face 32 of the jaw body 23.

The insert 40 shown in FIGURES 1 and 4 has a work abutting gripping, surface 42 of a diameter substantially equal to the diameter of the insert locating surface 41. The insert 40a differs from the insert 40 in that its work gripping surface 42a is somewhat larger in diameter than the locating surfaces 41 overlying the perimeter of the counterbore in which the insert is positioned. It will be apparent that inserts of many work surface diameters could be provided but with the particular and preferred construction shown only inserts of the two pictured sizes are required to provide a full range of jaw adjustment. For example, in a 12" chuck, the insert 42 may be of 1¼" diameter and the insert 42a of 2" outside diameter to provide external gripping of from 1" to 10¼" and internal gripping of from 3⅜" to 13½" in diameter.

As will be apparent from an examination of the drawings in the preceding discussion, the insert of selected size is positioned in the selected one of the counterbores by simply removing the associated bolt disposed in the selected counterbore. The bolt is then projected through a bore 45 in the insert with the bolt head positioned in an insert counterbore 46 and abutting an internal shoulder 47 in the insert. The bolt is then repositioned in its jaw bore and tightened down to clamp the insert in a selected position.

One of the outstanding advantages of the insert shown is that the serrated work surfaces 42, 42a, are circular. Thus, no particular orientation of the inserts is prerequisite to the gripping of work piece. Moreover, if positions of the serrated surfaces become worn, the insert can be rotated to provide a fresh unworn work gripping surface. Thus, the bolt provides a releasable clamping means to secure each insert in an adjusted position.

Although the invention has been described in its preferred form with a certain degree of particularity, it is understood that the present disclosure of the preferred form has been made only by way of construction and the combination and arrangement of parts may be resorted to without departing from the spirit and the scope of the invention as hereinafter claimed.

What is claimed is:

1. In combination with a machine tool having a rotatable spindle a chuck mounted on said spindle for rotation therewith and having radially movable jaws and means to actuate the jaws radially and grip a workpiece the chuck improvement which comprises:
    (a) said jaws each having insert locating surfaces adjacent a face;
    (b) a plurality of inserts each associated with a different jaw and each having positioning surfaces coacting with the locating surfaces to position the insert adjustably;
    (c) each of said inserts having a convexly curved work abutting surface, the work surface having a plurality of convexly curved serrations and having axes paralleling the axes of the chuck and each being disposed outwardly of the face of the associated jaw to the side of the jaw remote from the chuck; and
    (d) releasable means to secure each insert in an adjusted position by friction only against rotational forces from a gripped work piece.

2. The combination of claim 1 wherein each insert is constructed and arranged to be infinitely adjustable about its own axis and wherein each insert is circular.

3. The combination of claim 1 wherein the releasable means are bolts and certain of said bolts mount the jaws on chuck slides.

4. A chuck comprising:
    (a) a body having a plurality of radially extending jaw ways;
    (b) a plurality of jaw slides each mounted on a different one of the ways for reciprocation thereon;
    (c) a plurality of jaw bodies each mounted on a different one of said slides;
    (d) each jaw body having a plurality of bores disposed generally parallel to the axis of the chuck with certain of the bores being through bores, each of the bores having an aligned counterbore adjacent the face of its jaw;
    (e) a plurality of bolts associated with each of the jaw bodies and each disposed in a bore, the bolts in the through bores securing the jaw bodies to the slides;
    (f) a plurality of workpiece gripping jaw inserts each projecting into a counterbore of a different one of the bodies and secured there only by one of said bolts, each insert having a work piece gripping surface extending radially of the chuck and projecting outwardly of the body; and,
    (g) the remaining bolts other than those connecting the inserts having heads extending axially of the chuck past the face of the associated jaw.

5. The chuck of claim 4 wherein the bolts have hardened headts to provide wear surfaces.

6. The device of claim 4 wherein the inserts have circular and serrated surfaces.

7. A chuck comprising:
    (a) a body having a plurality of radially movable jaw slides;
    (b) a plurality of elongated relatively thin jaw bodies each mounted on a different one of said slides with a radially extending face on the side of the body remote from the chuck;
    (c) each jaw body having a plurality of through bores disposed generally parallel to the axis of the chuck, each of the bores having walls defining an aligned counterbore adjacent the face of its jaw;
    (d) a plurality of sets of bolts, each set associated with one of the jaws and each bolt disposed in a bore, two bolts of each set securing the jaw bodies to the slides;
    (e) a plurality of jaw inserts each associated with a different body and having alignment surfaces engaging the walls of one counterbore of the associated body, each insert surrounding one bolt and being connected to the associated body and located with respect thereto only by said one bolt;
    (f) the remaining bolts other than those connecting the inserts having heads extending past the face of the associated jaw for work piece abutment; and
    (g) each insert having a convexly circular, work abutment surface disposed outwardly from the associated jaw face and having circular serrations.

8. The device of claim 7 wherein the serrations of each insert are continuous about the circular work abutment surface.

9. The device of claim 8 wherein each work abutment surface is cylindrically contoured.

10. In combination with a machine tool having a rotatable spindle, a chuck mounted on said spindle for rotation therewith, said chuck comprising:
    (a) a chuck body having a plurality of radially extending ways;
    (b) a jaw body and slide means mounted in each of said ways for radial reciprocation;
    (c) workpiece clamping means connected to the jaw body and slide means for urging each of the body and slide means radially inwardly;
    (d) each jaw body and slide means having a plurality of radially aligned and spaced mounting bores paralleling the chuck axis, each bore including an outer counterbore, the counterbores being of uniform diameter;
    (e) a plurality of annular jaw inserts each equipped with a locating portion telescoped snugly into one of the counterbores of an associated one of the jaw body and slide means, each jaw body and slide means having one insert mounted on it;
    (f) a plurality of bolts each in a different jaw body bore, certain of the bolts securing portions of the jaw body and slide means together, said inserts each being secured to the jaw body and slide means only by the bolt in the same bore; and
    (g) each of said inserts having a cylindrically contoured, serrated surface projecting outwardly of the associated jaw body and slide means, said serrations each having an axis essentially paralleling the chuck axis.

11. In combination with a machine tool having a rotatable spindle, a chuck mounted on said spindle for rotation therewith and having radially movable jaws and means to actuate the jaws radially and grip a workpiece, the chuck improvement which comprises:
- (a) said jaws each having a circular insert locating surface adjacent a face;
- (b) a plurality of inserts each associated with a different jaw and each having a circular positioning surface positioned within and coacting with the locating surfaces to position the insert adjustably;
- (c) each of said inserts having serrated substantially circular, work abutting surfaces, the work abutting surfaces having axes paralleling the axes of the chuck and substantially coincident with the axes of the respective circular positioning surfaces, each work abutting surface being disposed outwardly of the face of the associated jaw to the side of the jaw remote from the chuck;
- (d) releasable clamping means to secure each insert in an adjusted position and permitting infinite relative insert adjustment when released; and,
- (e) each of said inserts being rotatively and infinitely adjustable in its associated jaw and maintained in an adjusted position solely by the friction between the insert and the jaw when clamped.

12. The combination of claim 11 wherein the releasable means are bolts and certain of said bolts mount the jaws on chuck slides.

13. The combination of claim 11 wherein each insert has an annular plane, jaw face abutting surface disposed essentially radially with respect to said positioning surface and abutting the face of the associated jaw.

References Cited by the Examiner

UNITED STATES PATENTS

| | | |
|---|---|---|
| 221,746 | 11/1879 | Skinner. |
| 1,685,899 | 10/1928 | Andrew _____ 279—123 |
| 1,952,206 | 3/1934 | Hogg _____ 279—123 |
| 2,488,822 | 11/1949 | McDonald. |
| 2,594,057 | 4/1952 | Muehling _____ 279—123 |
| 2,644,354 | 7/1953 | Schlageter _____ 279—116 |
| 2,896,958 | 7/1959 | Strauss _____ 279—123 |
| 2,926,922 | 3/1960 | Vermette _____ 279—114 |
| 2,950,117 | 8/1960 | Walmsley _____ 279—123 |

FOREIGN PATENTS

| | | |
|---|---|---|
| 21,612 | 11/1893 | Great Britain. |

ROBERT C. RIORDON, *Primary Examiner.*

HAROLD V. STAHLHUTH, *Assistant Examiner.*

UNITED STATES PATENT OFFICE
CERTIFICATE OF CORRECTION

Patent No. 3,278,194                                 October 11, 1966

Merritt B. Sampson

It is hereby certified that error appears in the above numbered patent requiring correction and that the said Letters Patent should read as corrected below.

Column 1, line 26, for "ben" read -- been --; column 2, line 62, for "in" read -- is --; column 3, line 24, for "of work piece." read -- of a work piece. --; same line 24, for "positions" read -- portions --; column 4, line 7, for "radially" read -- axially --; line 13, for "headts" read heads --.

Signed and sealed this 5th day of September 1967.

(SEAL)
Attest:

ERNEST W. SWIDER                               EDWARD J. BRENNER
Attesting Officer                                    Commissioner of Patents